Sept. 19, 1944.    H. LEONARD    2,358,580
LINE FASTENER
Filed April 17, 1943

INVENTOR
HENRY LEONARD
BY
ATTORNEY

Patented Sept. 19, 1944

2,358,580

UNITED STATES PATENT OFFICE 2,358,580

LINE FASTENER

Henry Leonard, Portland, Oreg.

Application April 17, 1943, Serial No. 483,375

2 Claims. (Cl. 242—117)

This invention relates generally to cable winding mechanisms and particularly to a line fastener.

The main object of this invention is to provide an exceedingly simple and efficient form of line fastener whereby a line will be quickly and securely fastened to a winch head or drum having a transversely concave surface, and of the type commonly referred to as "cat heads" or "nigger heads."

The second object is to provide an inexpensive and efficient line fastener which may instantly secure the end of a line or the bight thereof.

The third object is to construct a fastener of the class described which will not require any special tools to apply or release same.

The fourth object is to so construct the device that it is applicable to any of the common types of winch heads, and when once so applied, cannot be turned to an inoperative position.

The fifth object is to so construct the device, that it will not injure the line, whether it be of the wire or manila type, and also be adaptable to a wide range of line diameters.

These and other object are accomplished in the manner set forth in the following specification, as illustrated in the accompanying drawing, in which.

Similar numerals refer to similar parts throughout the several views.

Figure 3:
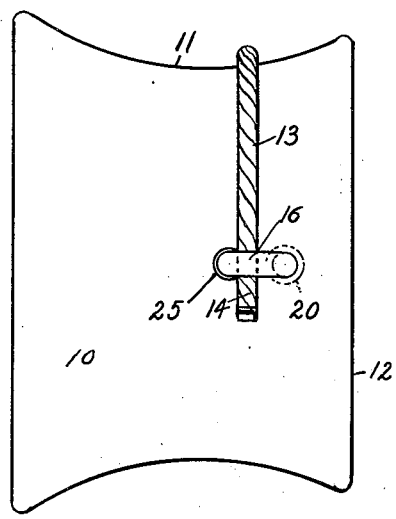
Fig. 3 is a plan of Fig. 2.
Figure 4:
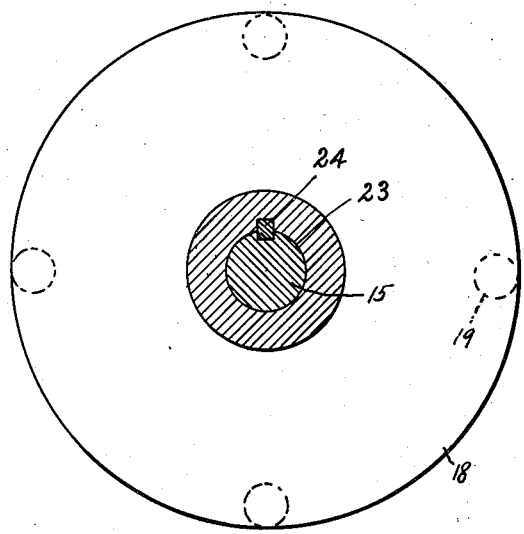
Fig. 4 is an enlarged section taken along the line 4—4 in Fig. 2.
Figure 2:
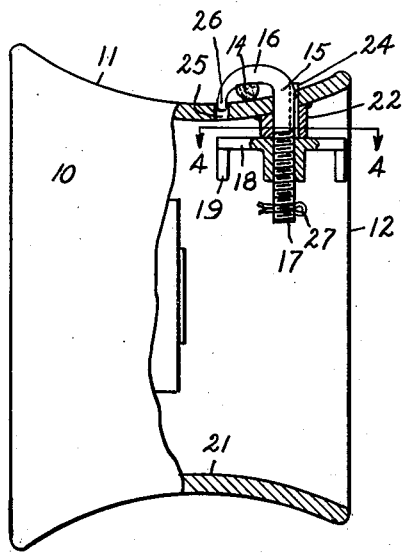
Fig. 2 is a side elevation of Fig. 1, with a portion cut away in section along the line 2—2 in Fig. 1.
Figure 1:
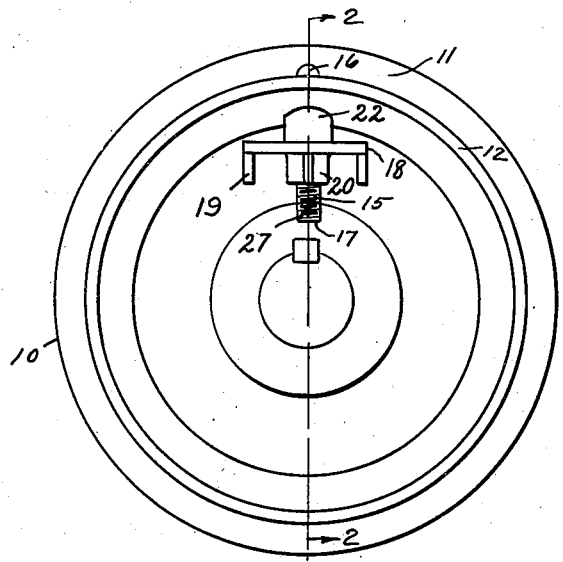
Fig. 1 is an end elevation of a winch head.

Referring in detail to the drawing, there is shown a common form of winch head 10 having the concave surface 11 terminating in the outer rim 12. The problem solved by my invention, is to secure a line 13 to the winch head 10. The common practice is to form a hole through the surface 11 through which the end 14 of the line 13 is passed, and then take several wraps around the head 10 to insure a proper hold being taken. However, the threading of the line 13 through a hole in the head 10 is not as easy as it appears, since the lines 13 are often quite stiff and unwieldy.

Referring particularly to my device, same will be seen to consist of a bolt 15 having a hook 16 formed on the outer end thereof, and having its threaded end 17 provided with a hand wheel nut 18 whose projections 19 provide convenient fulcrums for an operating bar (not shown). It is desirable to extend the hub 20 to afford protection for the threads of the bolt and also increase the number of threads in the nut itself.

Welded to the interior surface 21 of the head 10 is a boss 22 in which is formed a round hole 23 which is provided with a spline 24 which extends into the bolt 15 and prevents its rotation either under stress of the line, or while the nut 18 is being tightened or loosened.

The operation of the device is as follows:

Assuming that it is desired to hold the end 14 of the line 13 upon the head 10, it is merely necessary to back up the nut 18 to permit the bolt 15 to be withdrawn sufficiently to allow the head 14 to pass under the hook 16, and then tighten the bolt 15 by means of the nut 18, preferably by inserting a bar or heavy spike between the projections 19. If the bight of the line is to be secured to the head 10, the operation is the same.

In some cases, it will be found desirable to provide a hole 25 in the surface 11 to receive the point 26 of the hook 16 to prevent any undue strains from the line 13 being transferred to the spline 24. It will also be desirable to provide a cotter key 27 in the end of the bolt 17 to prevent the accidental operation of the parts.

The question may be raised as to the purpose of attaching the bight of the line to the head, and what would prevent the line from becoming twisted as the winding proceeds. The answer is that this is done only when a short, slow pull is required, and any twist which develops will naturally be taken out when the line is paid out.

I claim:

1. A winch head having a transversely curved cable winding surface, and having a radial opening therethrough, a hook bolt splined within said opening having its threaded end extending into said head and having a nut thereon, the hook end of said bolt projecting along the surface of said head in the plane of the head axis said head having a second opening therein adapted to receive the point of said hook bolt.

2. A winch head having a transversely concave cable winding surface, said head having two radial holes formed therethrough, a hook bolt extending through one of the holes toward the axis of the head, a boss formed on the interior of said head surrounding said bolt, having its face normal to the axis of the bolt, and a spline within said hole adapted to prevent the rotation of said bolt therein, the point of said hook extending into the other hole when in a line clamping position.

HENRY LEONARD.